(12) United States Patent
Goel et al.

(10) Patent No.: US 7,574,623 B1
(45) Date of Patent: Aug. 11, 2009

(54) METHOD AND SYSTEM FOR RAPIDLY RECOVERING DATA FROM A "SICK" DISK IN A RAID DISK GROUP

(75) Inventors: Atul Goel, Santa Clara, CA (US); Tomislav Grcanac, San Jose, CA (US); Stephen H. Strange, Mountain View, CA (US); Rajesh Sundaram, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 737 days.

(21) Appl. No.: 11/118,896

(22) Filed: Apr. 29, 2005

(51) Int. Cl.
*G06F 11/00* (2006.01)
(52) U.S. Cl. .......................................... 714/7; 714/47
(58) Field of Classification Search ................ None
See application file for complete search history.

(56) References Cited

U.S. PATENT DOCUMENTS

| | | | | |
|---|---|---|---|---|
| 5,611,069 A | * | 3/1997 | Matoba | 711/114 |
| 5,727,144 A | * | 3/1998 | Brady et al. | 714/6 |
| 5,737,510 A | | 4/1998 | Kakuta et al. | |
| RE36,846 E | | 8/2000 | Ng et al. | |
| 6,154,853 A | * | 11/2000 | Kedem | 714/6 |
| 6,401,214 B1 | * | 6/2002 | Li | 714/6 |
| 6,571,354 B1 | * | 5/2003 | Parks et al. | 714/7 |
| 7,133,966 B2 | * | 11/2006 | Sato et al. | 711/114 |
| 2003/0061546 A1 | * | 3/2003 | Collins et al. | 714/42 |
| 2004/0260967 A1 | * | 12/2004 | Guha et al. | 714/3 |
| 2005/0114728 A1 | * | 5/2005 | Aizawa et al. | 714/6 |
| 2005/0262385 A1 | * | 11/2005 | McNeill et al. | 714/5 |
| 2005/0283655 A1 | * | 12/2005 | Ashmore | 714/7 |

OTHER PUBLICATIONS

Richard R. Muntz and John C. S. Lui, "Performance Analysis Of Disk Arrays Under Failure", Proceedings of 16th VLDB Conference, Brisbane, Australia, 1990, pp. 162-173.

* cited by examiner

*Primary Examiner*—Gabriel L Chu
(74) *Attorney, Agent, or Firm*—Blakely, Sokoloff, Taylor & Zafman LLP (57) ABSTRACT

A method and system for recovering data from a "sick" disk are described. One embodiment of the invention relates to a RAID-based storage system that predicts the failure of a disk (e.g., a "sick" disk) in a RAID disk group. Accordingly, the storage system allocates a target disk, selected from several spare disks, to replace the "sick" disk in the RAID disk group upon completion of a disk-to-disk copy operation. Once a target disk has been allocated, a disk-to-disk copy operation is initiated to copy data from the "sick" disk to the target disk, thereby preventing the need to reconstruct data on the "sick" disk if the "sick" disk actually fails. During the disk-to-disk copy operation, client-initiated disk access operations continue to be serviced. Upon completion of the disk-to-disk copy operation, the storage system reconfigures the RAID disk group by swapping the target disk with the "sick" disk.

23 Claims, 11 Drawing Sheets

METHOD AND SYSTEM FOR RAPIDLY RECOVERING DATA FROM A "SICK" DISK IN A RAID DISK GROUP

TECHNICAL FIELD

At least one embodiment of the present invention relates generally to a data storage system utilizing a redundant array of independent disks (RAID). More particularly, the present invention relates to a method and system for rapidly recovering data from a "sick" disk in a RAID disk group.

BACKGROUND

Over the years, disk drive performance and reliability has been continually increasing. Today's disk drives are faster, have greater storage capacities, consume less power, and have a longer service life than disk drives from only a few years ago. Despite the many improvements, however, modern disk drives are still prone to mechanical failure. Consequently, mechanisms for protecting against data loss due to disk failures are an essential requirement of modern day computer systems.

To protect against data loss due to disk failures, many system developers implement data storage systems based on a redundant array of independent disks, or RAID. RAID is a category of disk-based storage that employs two or more physical disk drives in combination to create one logical storage device. There are a variety of RAID implementations, referred to as RAID Levels, each with its own particular set of characteristics. The more commonly implemented RAID Levels are selected for their performance and fault tolerance characteristics. In particular, most RAID-based data storage systems include the ability to recover "lost" data by reconstructing the "lost" data utilizing parity data.

Figure 1A:
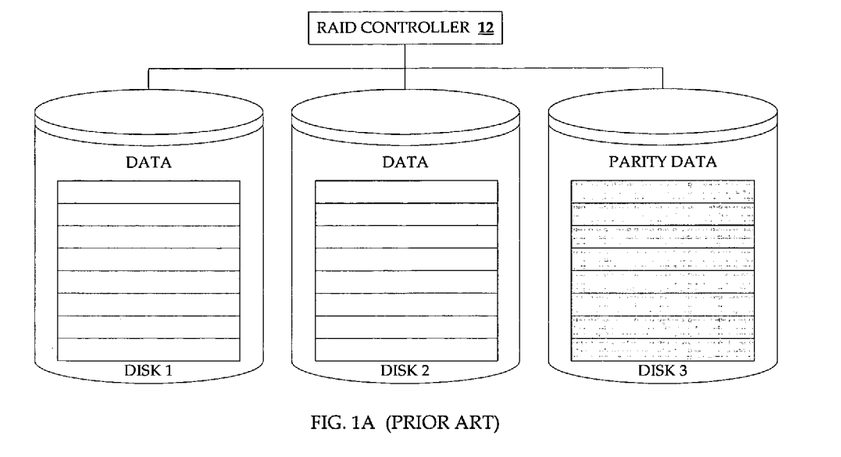
FIG. 1A illustrates a block diagram of a prior art RAID-based data storage sub-system with three independent disks arranged in a RAID disk group.

For example, FIG. 1A illustrates a data storage sub-system 10 based on a RAID Level 4 implementation. The data storage sub-system 10 includes a RAID disk group with three independent disk drives (e.g., disk 1, 2 and 3) connected to a common RAID controller 12. As illustrated in FIG. 1A, disks 1 and 2 are dedicated to storing blocks of data, while disk 3 is dedicated to storing blocks of parity data. Accordingly, during a write operation, data is first written to disks 1 and 2, and then parity data is written to disk 3. If any one of the three disks fails, the data on the failed disk can be reconstructed using data from the other two disks.

Figure 1B:
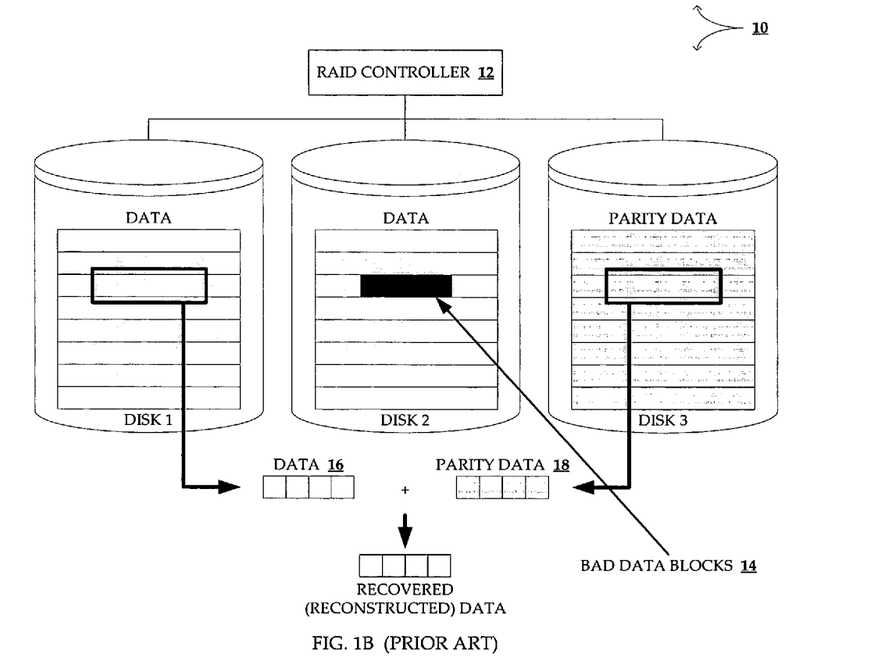
FIG. 1B illustrates a prior art method for reconstructing data from a bad disk block in a RAID-based data storage sub-system with three independent disks forming a RAID disk group.

The process of reconstructing "lost" data by combining data and parity data from other disks is generally referred to as data reconstruction. FIG. 1B illustrates a reconstruction operation for the data storage sub-system 10 illustrated in FIG. 1A. In FIG. 1B, disk 2 is shown with several bad disk blocks 14. If an attempt to access the bad disk blocks 14 on disk 2 fails during a read operation, the data from the bad disk blocks 14 on disk 2 can be reconstructed by combining data 16 from disk 1 and parity data 18 from disk 3. Moreover, if disk 2 fails completely, such that no data on disk 2 can be read, then a reconstruction operation can be initiated to reconstruct the entire data contents of disk 2.

In some RAID-based data storage systems, the reconstruction operation may be automated. For example, some RAID-based storage systems include "hot" spare disks that sit idle until needed. When a disk in a RAID disk group fails, a "hot" spare disk can automatically be swapped to take the place of the failed disk. Accordingly, the data storage system may automatically reconstruct the data from the failed disk and write the reconstructed data to the "hot" spare disk. The entire process happens seamlessly in the background while the data storage system continues to process read and write requests.

Although this scheme is generally useful in preventing data loss due to disk failures, several problems remain. Modern disk drives have relatively large storage capacities (e.g., 500 Gigabytes (GB)). Consequently, reconstructing the entire data contents of a failed disk can take a long time and place a heavy computational burden on the data storage system. Furthermore, the computational burden and the time it takes to reconstruct the data on a failed disk increases as the number of disks in the RAID disk group increases. Moreover, the burden placed on the data storage system during the reconstruction operation causes system performance degradation. For example, it may take longer for the data storage system to service client-initiated read and write requests while the data from the failed disk is being reconstructed. Finally, the reconstruction operation may increase the likelihood that a second disk in the RAID disk group will fail—a situation referred to as a double disk error—thereby resulting in a situation in which data cannot be reconstructed in a RAID 4 system.

Other RAID approaches have analogous drawbacks and limitations. For example, the problems described above exist for RAID 5, in which parity is distributed over all of the disks in a RAID array.

SUMMARY OF THE DESCRIPTION

A method and system for rapidly recovering data from a "sick" mass storage device in a redundancy group of mass storage devices are described. One aspect of the invention involves predicting the imminent failure of a particular mass storage device (e.g., a "sick" mass storage device) in a redundancy group of mass storage devices. In response to such a prediction, a device-to-device copy operation may automatically be initiated to copy data from the "sick" mass storage device to a spare mass storage device. Finally, when the device-to-device copy operation has completed, the redundancy group of mass storage devices may be reconfigured to replace the "sick" mass storage device with the spare mass storage device.

BRIEF DESCRIPTION OF THE DRAWINGS

The present invention is illustrated by way of example, and not by way of limitation, in the figures of the accompanying drawings, in which like references indicate similar elements, and in which.

DETAILED DESCRIPTION

A method and system for rapidly recovering data from a "sick" disk in a RAID disk group are described. In the following description, for purposes of explanation, numerous specific details are set forth in order to provide a thorough understanding of the present invention. It will be evident, however, to one skilled in the art that the present invention may be practiced without these specific details.

In one embodiment of the invention, a data storage system includes a RAID sub-system that monitors the "health" of each disk in a RAID disk group connected to a storage adapter of the data storage system. If it is determined that a disk in the RAID disk group is likely to fail in the near future (e.g., a "sick" disk), the data storage system automatically identifies a target disk from a pool of spare disks and initiates a disk-to-disk copy operation to copy data from the "sick" disk to the target disk. After the disk-to-disk copy operation is completed, the storage system swaps the "sick" disk and the target disk by taking the "sick" disk out of service, and replacing it with the target disk. In one embodiment of the invention, the entire process occurs transparently so as not to interfere with client read and write requests that are received as part of the data storage system's normal operations. Accordingly, the present invention provides a mechanism by which a RAID-based data storage system can rapidly recover data from a disk that is likely to fail, before it actually fails, thereby preventing the need to initiate a RAID reconstruction operation to reconstruct the data from the "sick" disk if it should actually fail.

Figure 2:
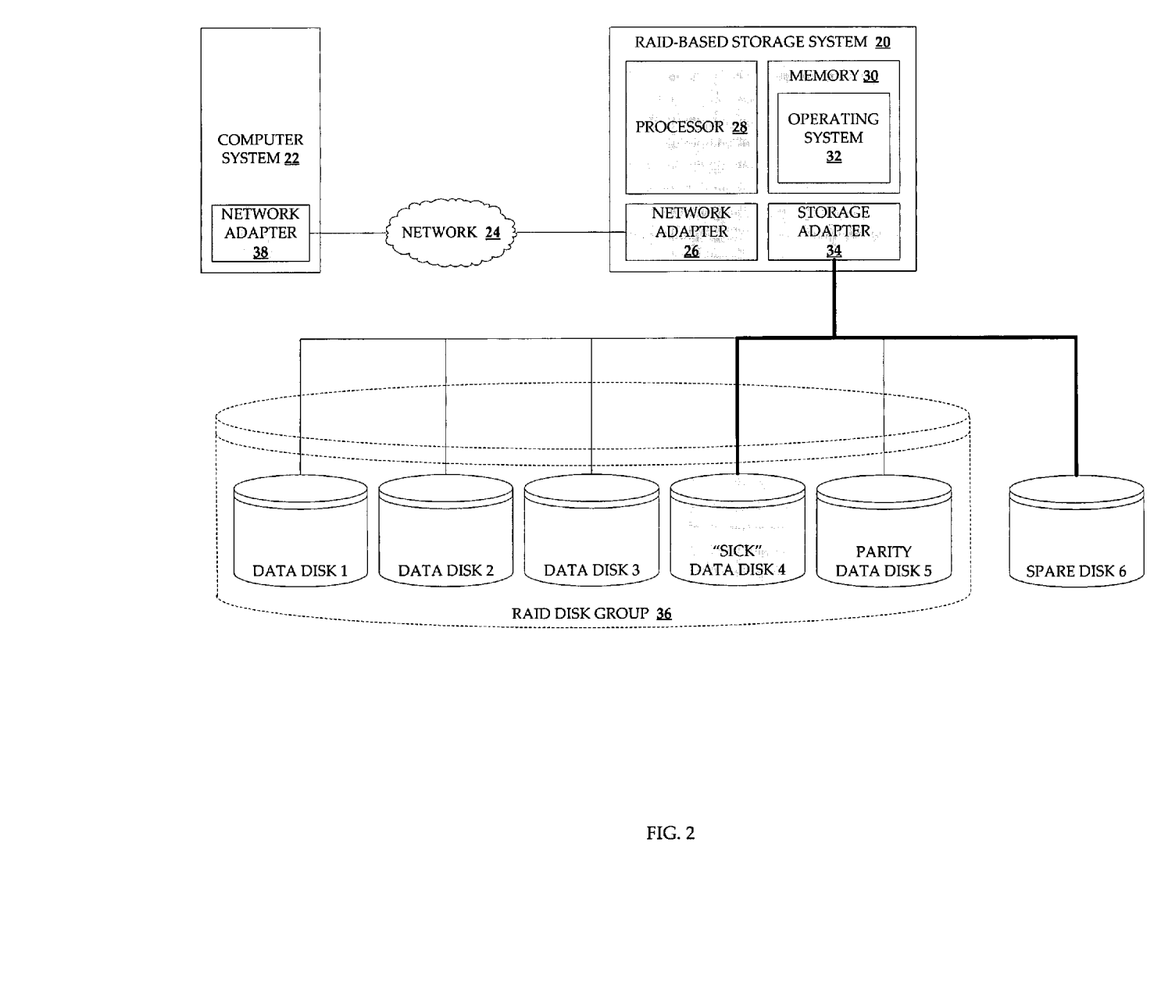
FIG. 2 illustrates an example of a RAID-based storage system, consistent with one embodiment of the invention, for providing data storage services.

FIG. 2 illustrates an example of a RAID-based storage system 20, consistent with one embodiment of the invention, for providing data storage services. As illustrated in FIG. 2, the RAID-based storage system 20 may be a special-purpose computer that provides data storage services to applications executing on one or more computer systems 22 connected to the storage system 20 via a network 24. Accordingly, the storage system 20 may have a network adapter 26 that connects the storage system 20 to a network 24 for sending and receiving data. In addition, the storage system 20 may have a processor 28 and a memory device 30 for executing a specialized storage-centric operating system 32 and various system software applications. The RAID-based storage system 20 may also have a specialized storage adapter 34 that connects the storage system 20 to several mass storage devices, such as electromagnetic disk drives, optical disk drives, or any other type of mass storage medium. As illustrated in FIG. 2, the storage adapter 34 connects the storage system 20 to a pool of six disks—five (e.g., disks 1, 2, 3, 4 and 5) of which are logically organized as a RAID disk group 36, or RAID volume, and one that is a spare disk (e.g., spare disk 6). It will be appreciated by those skilled in the art that the present invention is applicable to a wide variety of RAID-based data storage systems. For example, in one embodiment of the invention, the RAID-based storage system 20 may be a network-attached storage (NAS) file server that provides file services to the computer system 22 connected via the network 24. Accordingly, in one embodiment of the invention, both the computer system 22 and the RAID-based storage system 20 may include network adapters (e.g., network adapters 26 and 38) that communicate by sending and receiving files encapsulated as packets of data in accordance with one or more standard networking protocols, such as the Transfer Control Protocol and the Internet Protocol (e.g., TCP/IP), over an Ethernet-based network 24.

In an alternative embodiment of the invention, the RAID-based storage system 20 may provide block-level data storage services to one or more computer systems 22 over a local area network (LAN), a wide area network (WAN), or a storage area network (SAN). For example, block-level data may be communicated over a standard Ethernet network by encapsulating data and small computer system interface (SCSI) commands into IP-based data packets (e.g., iSCSI). Alternatively, the network adapter 38 of the computer system 22 may communicate data at the block-level over a network 24 based on a fibre channel architecture. In yet another embodiment of the invention, the RAID-based storage system 20 may provide both file and block-level data storage services.

In addition to being independent of any one particular type of data storage system (e.g., host-based, direct-attached, network-attached, etc.), the present invention may be implemented to function with various RAID implementations, generally referred to as RAID Levels. For example, in one embodiment of the invention, the RAID disk group 36 may be configured to operate based on RAID Level 4. Accordingly, one disk in the RAID disk group may be dedicated to storing parity data. In another embodiment of the invention, a RAID disk group may be configured to operate based on RAID Level 5, such that parity data is dispersed across all disks in the RAID disk group. Those skilled in the art will appreciate that aspects of the present invention may be implemented in data storage systems based on other RAID Levels as well. Furthermore, the present invention is independent of the number of disks in any one RAID disk group. That is, in various embodiments of the invention, the number of disks forming a RAID disk group may vary.

Figure 3:
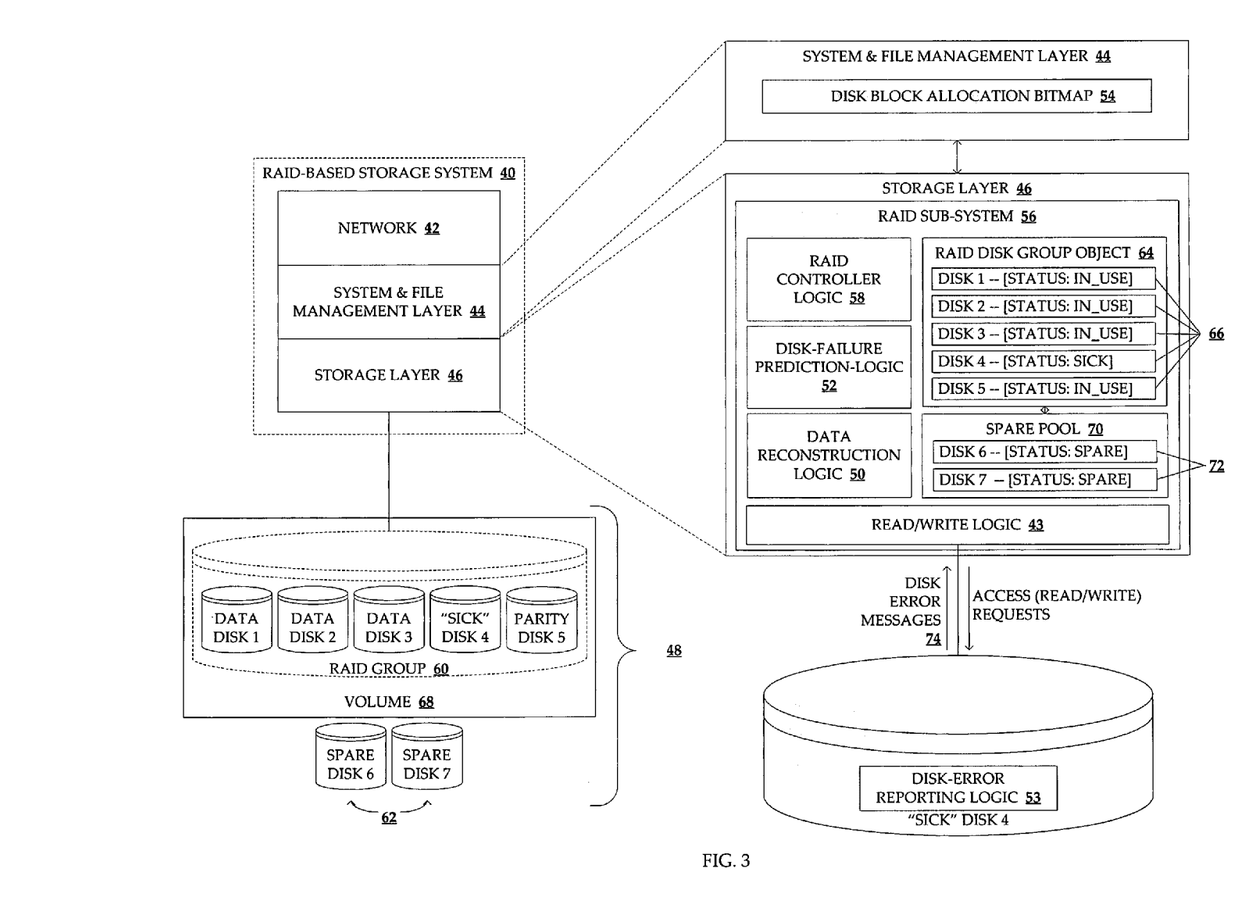
FIG. 3 illustrates a block diagram of the various functional or logical components of a data storage system in one embodiment of the invention.

FIG. 3 illustrates a block diagram of the various functional or logical components of a data storage system 40, according to one embodiment of the invention. As illustrated in FIG. 3, the data storage system 40 may be thought of as having three primary components or layers—a network layer 42, a system and file management layer 44, and a storage layer 46. In FIG. 3, various details that are not pertinent to the invention have been omitted in an effort to avoid obscuring the invention with unnecessary detail. Furthermore, depending on the implementation, one or more of these three primary components or layers (e.g., 42, 44 and 46) may be excluded. For example, aspects of the present invention may be implemented in a host-based system having a directly-attached storage (DAS) RAID sub-system, thereby eliminating the need for a network layer 42.

It will be appreciated by those skilled in the art that the various logical components illustrated in FIG. 3 may be implemented in software, hardware, or a combination of software and hardware. For example, in one embodiment of the invention, the read/write logic 43, which facilitates the actual transfer of data between the storage system 40 and the various disks 48, may be implemented as a device driver (e.g., software application) that controls a storage adapter with integrated RAID disk controller circuitry (e.g., hardware). Similarly, it will be appreciated by those skilled in the art that the functions of the other logical components, such as the data reconstruction logic 50 and the disk-failure prediction logic 52, may be implemented in hardware, software, or a combination thereof.

Referring again to FIG. 3, generally, the network layer 42 sends and receives data over a network. For example, in one embodiment of the invention, the network layer 42 may receive IP data packets containing a request to read data from, or write data to, the storage system 40. The network layer 42 may receive the IP data packets, extract the request, and forward the request to the system and file management layer 44 along with data that may represent a file. As described briefly above, the network from which the network layer 42 receives data may be a LAN, WAN or SAN.

In one embodiment of the invention, the system and file management layer 44 may include logic that implements a file system. For example, in one embodiment of the invention, the file management layer 44 may include a write anywhere file layout (WAFL®) file system, such as the NetApp WAFL® filesystem commonly included in NAS filers® from Network Appliance, Inc. of Sunnyvale, Calif. Accordingly, when the file management layer 44 receives a request to store (e.g., write) a file, the file management layer 44 may first determine the disk and disk blocks to which the file is to be written. Similarly, when the file management layer 44 receives a request to read a file, the file management layer 44 may first determine which disk and disk block (or blocks) contain the data that represents the requested file. Accordingly, one function of the file management layer 44 is mapping disk blocks to file disk blocks.

In addition, the file management layer 44 may keep track of which disks and/or disk blocks are in use (e.g., allocated), and which disk blocks are not in use (e.g., unallocated). For example, in one embodiment of the invention, the file management layer 44 may include a disk block allocation bitmap 54 that indicates which disk blocks have been allocated (e.g., are currently being used) and which disk blocks have not been allocated. For example, the disk block allocation bitmap 54 may include one bit for every block on a disk. Each bit value (e.g., "1" or "0") in the bitmap may determine whether or not a corresponding disk block has been allocated. In one embodiment, each disk may be associated with its own disk block allocation bitmap 54. Alternatively, a single disk block allocation bitmap may be used to keep track of all disk blocks on all disks.

In one embodiment of the invention, the storage layer 46 may include a RAID sub-system 56 that manages the logical organization of numerous mass storage devices 48, such as disks, and controls the actual physical interface between the mass storage devices 48 and the storage system 40. For example, the RAID sub-system 56 may include RAID controller logic 58 that keeps track of the logical organization of each disk attached to the storage system's 40 storage adapter, and in particular, the logical organization of one or more groups of disks forming a RAID disk group 60. For example, the RAID controller logic 58 may manage one or more data objects that represent physical or logical storage devices. In FIG. 3, for example, the RAID controller logic 58 may manage and/or control the operation of each disk in the RAID disk group 60, as well as any spare disks 62 that may be connected to the storage system's 40 storage adapter.

In addition, the RAID controller logic 58 may access portions of memory that contain data objects representing the RAID disk group and each physical disk. Accordingly, each data object representing a disk 66 may include one or more bits (e.g., status bits) representing the state of the disk. For instance, the status bits of the data object representing a disk may indicate whether the disk is associated with a particular RAID disk group and/or what state the disk is in. In one embodiment, the RAID controller logic 58 may include a finite state machine (not shown) that controls the state of each disk based on one or more inputs received from either the file management layer 44, or some other component of the RAID sub-system 56. For example, in one embodiment of the invention, the state of a particular disk may be changed from "IN_USE" to "SICK" when it is determined that the particular disk may fail in the near future.

In FIG. 3, the RAID sub-system 56 is shown to have a RAID disk group object 64 including data objects 66 representing the five disks comprising the RAID disk group 60, which in turn make up an individual RAID volume 68. Each disk data object 66 is shown to include a status, which is determined by the bit values of one or more status bits. For example, disks 1, 2, 3 and 5 are shown to have a status of "IN_USE" while disk 4 is shown to have a status of "SICK." In addition, the RAID sub-system 56 of FIG. 3 includes a data object representing a pool of spare disks 70 including individual data objects 72 representing spare disks 6 and 7.

In one embodiment of the invention, the RAID-based storage system 40 includes disk-failure prediction-logic 52 for predicting the imminent failure of one or more mass storage devices 48 connected to the data storage system's storage adapter. The disk-failure prediction-logic 52 may, for example, receive and analyze error messages 74 received from disks in the RAID disk group 60. Accordingly, in one embodiment of the invention, the disk-failure prediction-logic 52 may automatically make a determination that a particular disk in the RAID disk group 60 is likely to fail. Consequently, the disk-failure prediction-logic 52 may generate a status signal to indicate to the RAID controller that the status of the corresponding "sick" disk should be changed, for example, from "IN_USE" to "SICK". Alternatively, the disk-failure prediction-logic 52 may be integrated with an administrative interface that facilitates the reporting of disk errors to an administrator. Consequently, in one embodiment of the invention, an administrator may make the determination that a disk is "sick."

In the context of the present invention, a "sick" disk is a disk that has been identified by the data storage system 40, or an administrator, as being likely to fail, despite the disk's present ability to respond to most client-initiated read and/or write requests in a timely manner. It will be appreciated by those skilled in the art that modern disks may have a wide variety of operational modes. For example, many disks have a variety of operational parameters that may be configured to adjust the behavior and functionality of the disk. Consequently, portions of a disk which may not be accessed in an optimal or normal operational mode, may be accessed in a different operational mode, such as a diagnostic or recovery mode. Accordingly, a disk that reports an error when attempting to access a disk block requested in a client-initiated read request may nonetheless be able to read the requested data in an alternative operational mode. In one embodiment of the invention, a "sick" disk may operate in an operational mode other than its optimal or normal operational mode when servicing read requests associated with a disk-to-disk copy operation.

One skilled in the art will recognize that there are numerous methods for predicting the imminent failure of a particular disk, and thereby making a determination that a disk is a "sick" disk. For example, in one embodiment of the invention, each disk in the data storage system may include self-monitoring and reporting technology, referred to as SMART (e.g., disk-error reporting logic 53), which may be subject to industry standards and is generally well known by those skilled in the art. Accordingly, a SMART-capable disk may report one or more errors or warning messages to the data storage system indicating that the particular disk is operating outside of one or more "normal" operational thresholds, despite being capable of servicing most read and/or write requests in a timely manner.

The disk-failure prediction-logic 52 may be a system software component that executes on the RAID-based storage system 40. For example, when implemented as a component of the storage system 40, the disk-failure prediction-logic 52 may predict the failure of a particular disk by analyzing the response times associated with read and write requests directed to a disk. If, for example, a particular disk in the RAID disk group is consistently slow to respond to read and/or write requests, disk-failure prediction-logic 52 may determine the disk is likely to fail. Alternatively, the disk-failure prediction logic may receive one or more error messages 74 from one or more disks in the RAID disk group 60. Accordingly, the disk-failure prediction-logic 52 may analyze the error or errors and make a determination as to whether the error or errors indicate the imminent failure of a disk.

In one embodiment of the invention, each error message 74 may be of a particular type. Accordingly, some error types may be sufficient to warrant a change in disk status. For example, the disk-failure prediction-logic 52 may determine the imminent failure of a particular disk based solely on the receipt of a particular type of error message from a particular disk. Alternatively, the total number of error messages received may be used to determine that a disk is likely to fail. Similarly, the frequency with which one or more error messages and/or types of error messages is received may be compared to an error message frequency threshold for determining whether a disk is likely to fail and whether the disk's status should be changed to "SICK."

In an alternative embodiment of the invention, the disk-failure prediction-logic 52 may be implemented as part of each individual disk 48. For example, the disk controller of each disk may have the capability of monitoring errors and determining when a disk is likely to fail. Accordingly, each disk may have the capability of reporting an error to the storage system 40 indicating the imminent failure of the disk. The RAID controller logic 58 may receive the error and change the status of a disk data object based on the receipt of the error.

In addition to changing the state of a disk from "IN_USE" to "SICK," the RAID controller logic 58 may analyze the pool of spare disks to determine which spare disk should be selected to replace the "sick" disk. In one embodiment, once the state of a disk in the RAID disk group has been changed to "SICK" and a target disk has been allocated, the RAID controller logic 58 may initiate a disk-to-disk copy operation. The disk-to-disk copy operation facilitates the copying of data from the "sick" disk to the target disk. For example, the disk-to-disk copy operation may systematically perform a read operation to read data on the "sick" disk, followed by a write operation to write the data to the target disk.

In an alternative embodiment, an administrator may initiate the disk-to-disk copy operation. For example, in one embodiment of the invention, the RAID controller logic 58 and the disk-failure prediction-logic 52 may be tightly integrated with an administrative interface, such that an administrator may make a determination that a disk is "sick" by analyzing disk errors reported via the interface. Accordingly, the administrator may select and allocate a target disk, and then initiate the disk-to-disk copy operation via the administrative interface, which may be a command line interface or a graphical user interface. The RAID controller logic 58 may respond to the administrator's manipulation of the administrative interface by changing the state of a disk and then initiating a disk-to-disk copy operation.

In one embodiment of the invention, if a read error occurs during a read operation associated with the disk-to-disk copy operation, the RAID controller may initiate a reconstruction operation to reconstruct the data from the one or more disk blocks that cannot be read. For example, in one embodiment of the invention, the RAID-based storage system 40 may include data reconstruction logic 50 for reconstructing data that cannot be directly read from a "sick" disk during a disk-to-disk copy operation. The data reconstruction logic 50 may read data from all disks in the RAID disk group other than the "sick" disk, and then reconstruct the "lost" data, for example, by performing a series of XOR operations on the data. One skilled in the relevant art will appreciate the many known algorithms for performing a RAID reconstruction operation.

In the event that a "sick" disk has some type of catastrophic failure during the disk-to-disk copy operation such that the "sick" disk can no longer be accessed, the data reconstruction logic may begin reconstructing data from the "sick" disk at the point where the disk-to-disk copy operation ended. For example, rather than reconstructing the entire data contents of the "sick" disk, the data reconstruction logic 50 may reconstruct only the data on the portion of the "sick" disk that was not copied to the target disk during the time that the disk-to-disk copy operation was executing.

In various embodiments of the invention, the RAID-based storage system 40 may handle client-initiated read and write requests directed to a storage area (e.g., a disk block or data block) on a "sick" disk in one of several different ways during a disk-to-disk copy operation. In one embodiment of the invention, the storage system 40 may avoid reading from and writing to the "sick" disk during the disk-to-disk copy operation. For example, the storage system 40 may redirect client-initiated write requests to disks in the RAID disk group other than the "sick" disk while the disk-to-disk copy operation is proceeding. Similarly, in one embodiment, the storage system 40 may reconstruct data from the "sick" disk rather than forward a read request to the "sick" disk for servicing. By limiting the number of client-initiated read and write requests that are directed to the "sick" disk, the storage system 40 limits the stress placed on the "sick" disk and reduces the likelihood of experiencing slow responses from the "sick" disk.

However, in another embodiment of the invention, during the disk-to-disk copy operation, client-initiated read and/or write requests may be serviced by the "sick" disk. In one embodiment of the invention, the disk-to-disk copy operation may occur concurrently with one or more client-initiated read or write operations directed to the "sick" disk. For example, the disk-to-disk copy operation may operate so as to limit any interference with the normal operation of the RAID-based storage system. In one embodiment of the invention, the RAID controller logic 58 may prioritize read and write requests by giving client-initiated read and write requests higher priority than read and write requests associated with a disk-to-disk copy operation. Although, the disk-to-disk copy operation may potentially increase the response time of the storage system, a disk-to-disk copy operation involves significantly less computation and is therefore faster than a RAID reconstruction operation.

Figure 4:
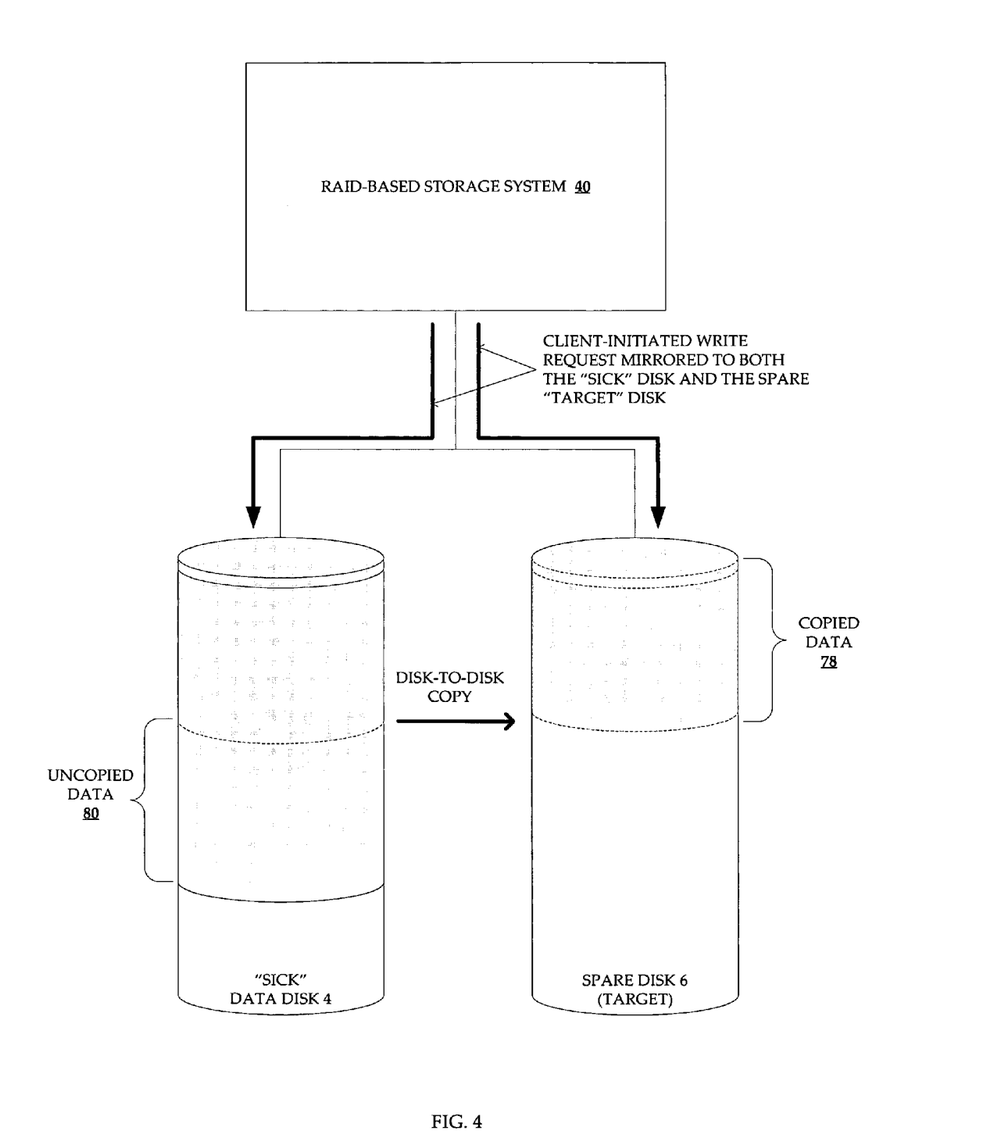
FIGS. 4, 5, 6 and 7 illustrate various data paths associated with alternative methods of handling client-initiated read and/or write requests during a disk-to-disk copy operation, according to various embodiments of the invention.

In FIG. 4, the RAID-based storage system 40 is shown in the midst of a disk-to-disk copy operation. Accordingly, the darkened portions of the "sick" disk (e.g., "sick" disk 4) and the target disk (e.g., spare disk 6) represent storage areas that have been allocated and are storing valid data. Moreover, the darkened portion of the target disk (e.g., copied data 78) represents data that has been copied to the target disk from the "sick" disk, while the uncopied data 80 on the "sick" disk represents the portion of data on the "sick" disk that has not yet been copied to the target disk. In one embodiment of the invention and as illustrated in FIG. 4, when the RAID-based storage system 40 receives a client-initiated write request directed to a disk block on the "sick" disk during a disk-to-disk copy operation, the write request may be mirrored so that it is forwarded to both the "sick" disk and the target disk for servicing. Accordingly, data associated with the write request will be written to both the "sick" disk and the target disk. Consequently, if it is later determined during a read operation that the disk block to which the data was written on the "sick" disk is a bad disk block and the data cannot be read from the "sick" disk, the data may be read from the target disk instead.

Figure 5:
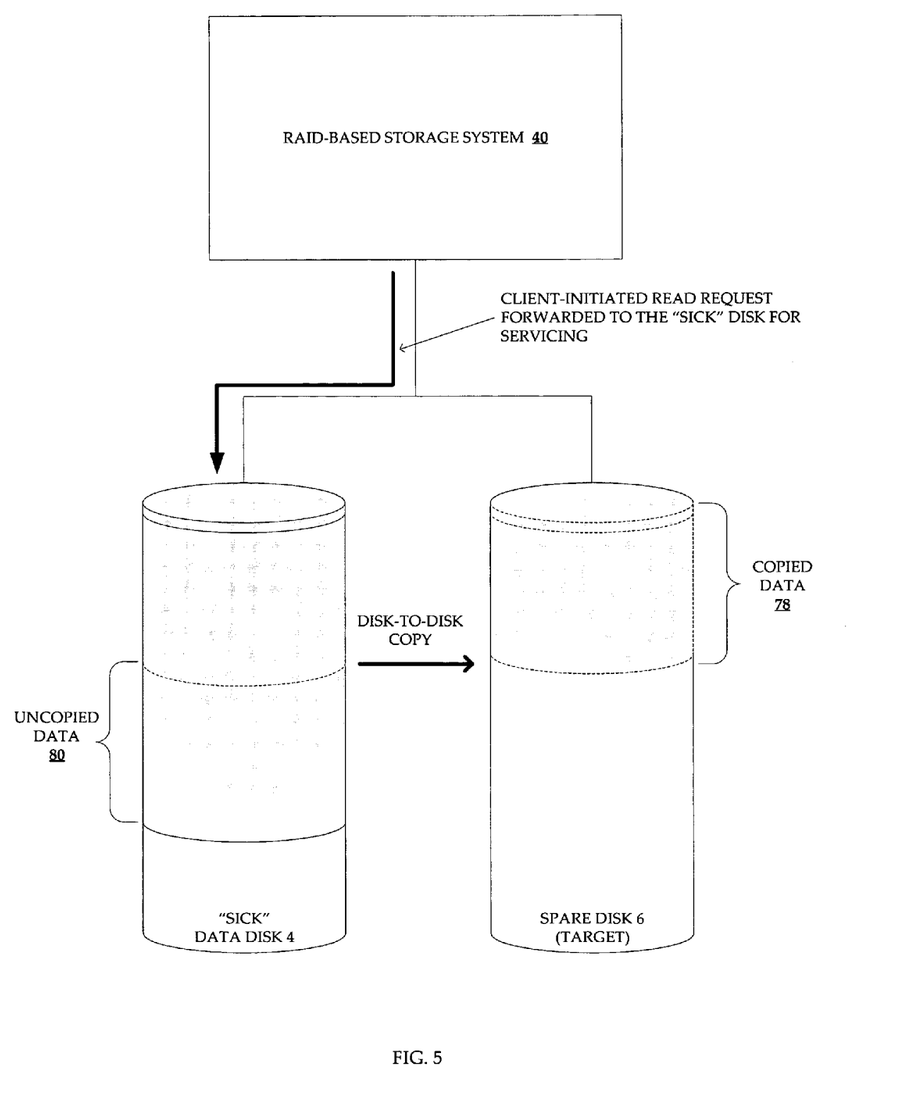

As illustrated in FIG. 5, in one embodiment of the invention, client-initiated read requests received by the RAID-based storage system 40 during a disk-to-disk copy operation are forwarded to the "sick" disk for servicing. However, if the "sick" disk cannot read the disk block requested in the client-initiated read request, the RAID-based storage system 40 may initiate a data reconstruction operation to reconstruct the data by reading corresponding data from the other disks in the RAID disk group and computing the data from the "sick" disk that has been lost to the bad disk block.

Figure 6:
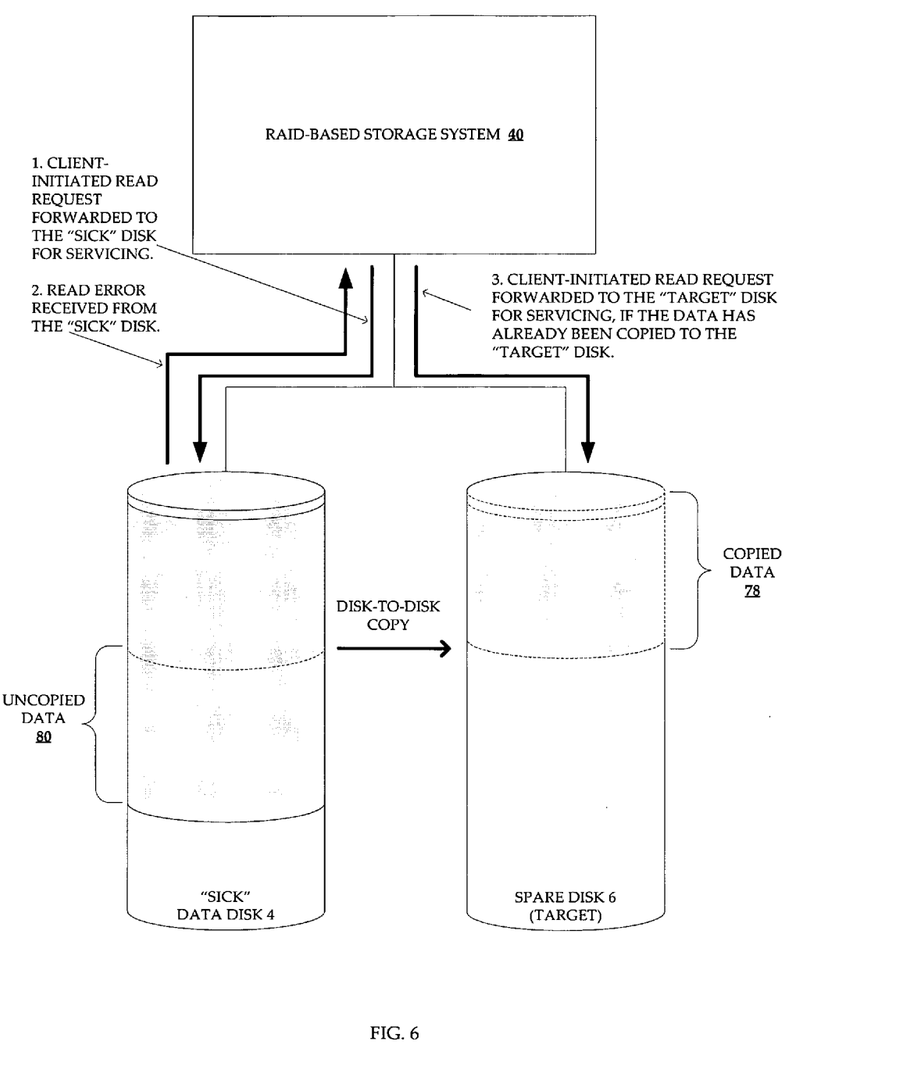

In an alternative embodiment of the invention, a more complex procedure may be implemented to handle client-initiated read requests received during a disk-to-disk copy operation. For example, in one embodiment of the invention and as illustrated in FIG. 6, when the RAID-based storage system 40 receives a client-initiated read request for a particular disk block on the "sick" disk, the RAID-based storage system 40 may first forward the read request to the "sick" disk for servicing. If the "sick" disk reports an error indicating that the "sick" disk could not read the particular disk block, rather than reconstruct the data, the RAID-based storage system 40 may determine whether the data from the inaccessible disk block has been copied to the target disk as part of the disk-to-disk copy operation. Accordingly, if the RAID-based storage system 40 determines that data from the particular disk block has been copied to the target disk, the RAID-based storage system 40 may forward the read request to the target disk for servicing. However, if the requested disk block has not yet been copied to the target disk as part of the disk-to-disk copy operation, then the RAID-based storage system 40 may initiate a data reconstruction operation to reconstruct the data from the bad disk block on the "sick" disk. The reconstructed data may then be provided in response to the read request. Moreover, in one embodiment of the invention, the reconstructed data may be written to the target disks as part of the disk-to-disk copy operation. Such a process may be referred to as a "piggy-back" operation, because the data reconstruction operation is used to service a client-initiated read request and update the corresponding disk block on the target disk as part of the disk-to-disk copy operation.

Figure 7:
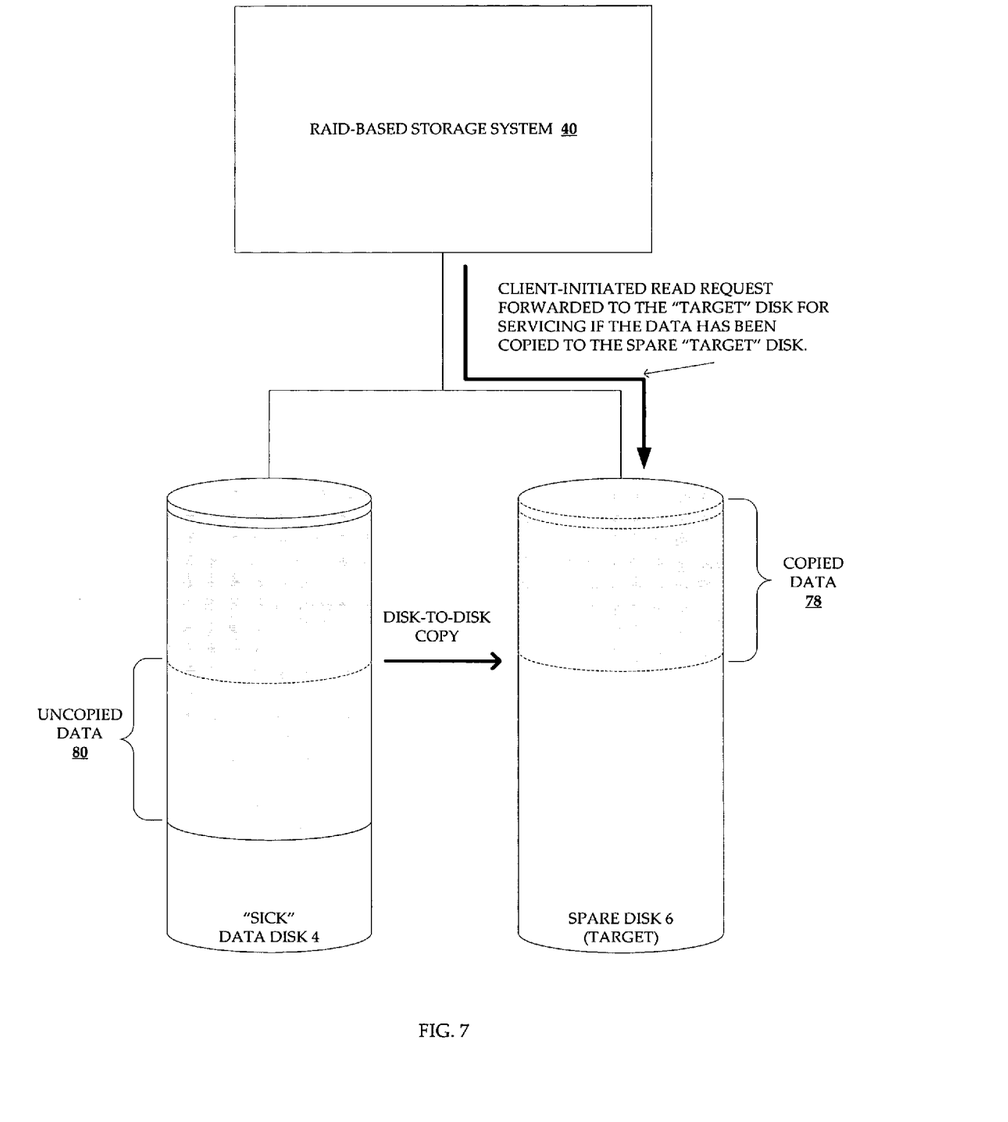

In yet another embodiment of the invention, the RAID-based storage system 40 may make a determination as to the best disk from which to read requested data each time a client-initiated read request is received during a disk-to-disk copy operation. For example, as illustrated in FIG. 7, the RAID-based storage system 40 may determine if the requested data has already been copied to the target disk, and if so, the client-initiated read request may be forwarded to the target disk for servicing. However, if the requested data has not been copied to the target disk, the client-initiated read request may be forwarded to the "sick" disk for servicing. In one embodiment of the invention, the disk-to-disk copy operation may proceed by copying disk blocks in a sequential order based on disk block numbers. Consequently, the RAID-based storage system 40 may compare the disk block number in a read request with the most current disk block number that has been copied as part of the disk-to-disk copy operation. If, for example, the disk block number of the disk block requested in the client-initiated read request is less than the current disk block number being processed by the disk-to-disk copy operation, then the storage system 40 may forward the read request to the target disk for servicing. However, if the disk block number of the disk block being requested in the client-initiated read request is greater than the current disk block being processed by the disk-to-disk copy operation, then the storage system may forward the read request to the "sick" disk for servicing.

Figure 8:
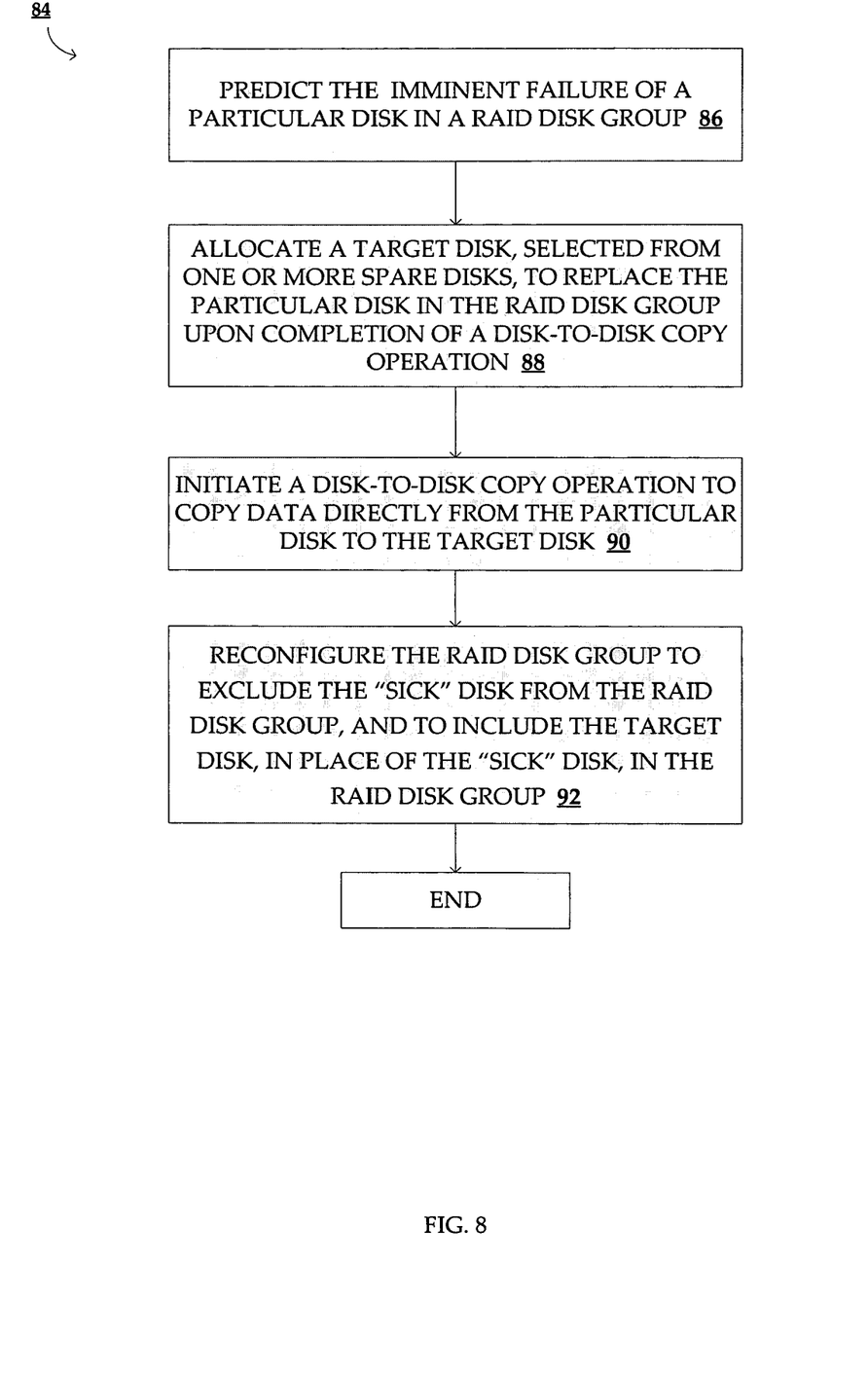
FIG. 8 illustrates an example of the operations involved in a method for rapidly recovering data from a "sick" disk, according to one embodiment of the invention.

FIG. 8 illustrates an example of the operations involved in a method 84 for rapidly recovering data from a "sick" disk, according to one embodiment of the invention. At operation 86, a prediction is made that a disk in the RAID disk group may fail. For example, an administrator may analyze disk errors reported in a graphical user interface, and based on the analysis, make a prediction that one disk in the RAID disk group is likely to fail. Alternatively, in one embodiment, disk-failure prediction-logic 52 may automatically predict the imminent failure of a particular disk in the RAID disk group. For example, disk-failure prediction-logic may reside on either the storage server 40, or on each disk. Accordingly, if the disk-failure prediction logic 52 resides on the storage system 40, the disk-failure prediction logic may analyze disk response times, or error messages reported by each disk. Alternatively, if the disk-failure reporting logic resides on each disk, a disk itself may report to the storage system that disk failure is imminent. Furthermore, in various embodiments of the invention, disk-failure prediction may be based on the type, number and/or frequency of the error messages received from a particular disk.

Once it has been determined that a disk is likely to fail and the state of the disk has been changed accordingly, at operation 88, a target disk may be selected from a pool of spare disks and allocated to eventually replace the "sick" disk after the data contents of the "sick" disk have been copied to the target disk by a disk-to-disk copy operation. For example, in one embodiment of the invention, an administrator may select and allocate the target disk via a user interface. Alternatively, RAID controller logic 58 may automatically select a spare disk from a pool of spare disks and allocate a particular spare disk as a target disk. The allocation operation may involve analyzing the status, or state of one or more spare disks, and selecting the spare disk that is best suited to replace the "sick" disk. Allocating the spare disk as a target disk may involve changing one or more status bits in a data object stored in memory that represents the target disk to reflect the change in the spare disks state (e.g., from "SPARE" to "IN_USE_TARGET").

At operation 90, a disk-to-disk copy operation is initiated to copy data from the "sick" disk to the target disk. For example, the disk-to-disk copy operation may systematically read data from the "sick" disk, and write data to the target disk. In one embodiment of the invention, the disk-to-disk copy operation may be automatically initiated by RAID controller logic 58 in response to identifying a "sick" disk and allocating a target disk. Alternatively, the disk-to-disk copy operation may be initiated by an administrator. Furthermore, the disk-to-disk copy operation may be optimized by utilizing a disk block allocation bitmap to determine which disk blocks on the "sick" disk have been allocated and therefore need to be copied to the target disk. In one embodiment of the invention, if the "sick" disk reports a read error during the disk-to-disk copy operation, the storage system 40 may initiate a data reconstruction operation to reconstruct the data that cannot be read on the "sick" disk.

In one embodiment of the invention, during the systematic disk-to-disk copy operation, client-initiated read and write requests continue to be serviced as normal. For example, in one embodiment of the invention, the RAID controller logic 58 may interleave one or more client-initiated disk access operations directed to the "sick" disk with the disk access operations associated with the disk-to-disk copy operation. Furthermore, in one embodiment, the RAID controller logic 58 may prioritize the sequence of the access operations to give priority to client-initiated requests, thereby limiting the possibility of system performance degradation due to the disk-to-disk copy operation. In addition, during the disk-to-disk copy operation, all write requests directed to disk blocks on the "sick" disk may be mirrored to the target disk.

Finally, at operation 92, the RAID-based storage system reconfigures the RAID disk group by taking the "sick" disk out of service, and replacing it with the target disk. After the disk-to-disk copy operation, the target disk is essentially a duplicate of the "sick" disk. In one embodiment of the invention, the disk swap is accomplished in part by changing one or more status bits that represent the state of a disk. For example, the "sick" disk may be changed from a "SICK" state to a "FAILED" state. Similarly, the target disk may change state from "IN_USE_TARGET" to "IN_USE."

In one embodiment of the invention, the entire method 84 may be automated to occur with no interaction on the part of an administrator. Alternatively, an administrator may initiate one or more of the operations manually via an administrative interface. Because the data contents of the "sick" disk are copied directly to a target while the "sick" disk is still capable of servicing read and write requests, the computational burden resulting from a lengthy RAID disk reconstruction operation is avoided. Furthermore, by replacing the "sick" disk before it actually fails, the RAID-based storage system 40 may potentially prevent a double disk error.

Figure 9:
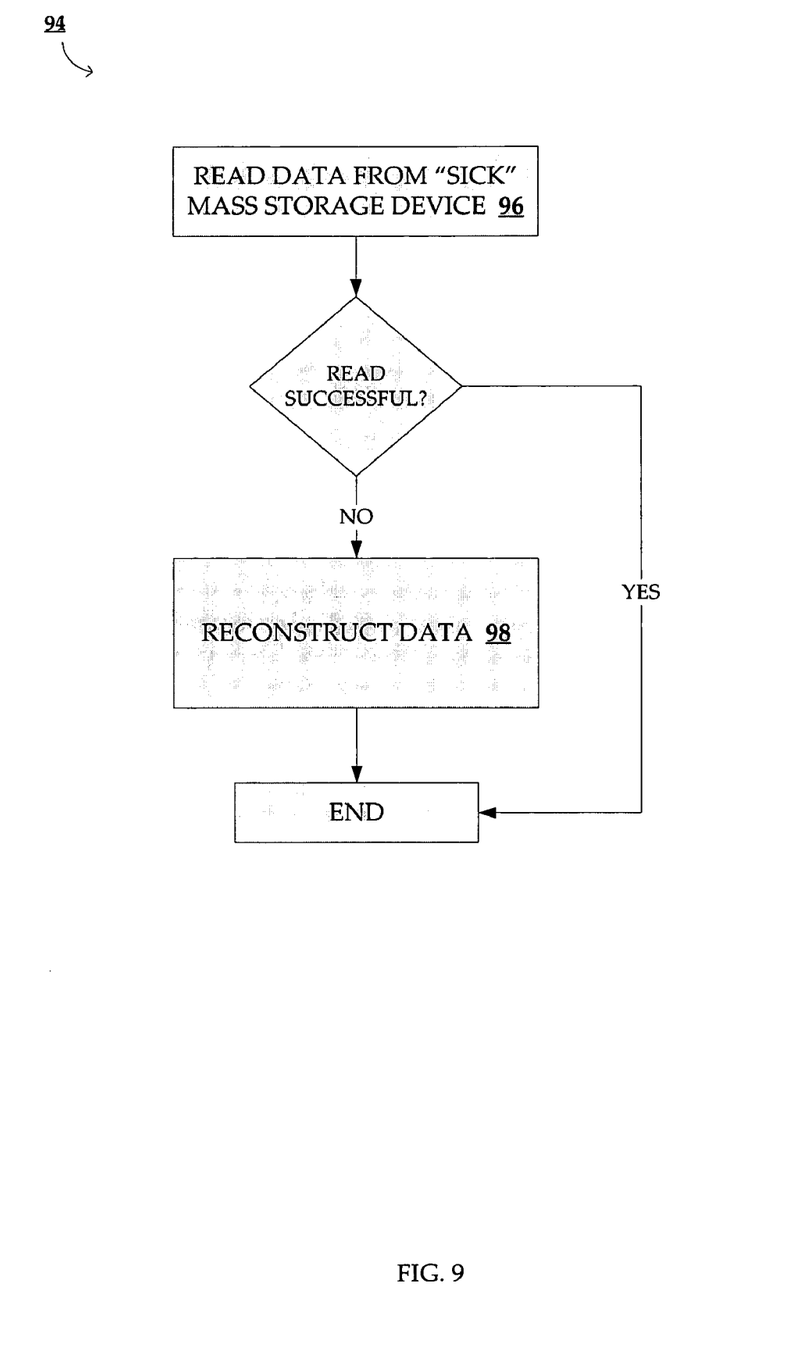
FIGS. 9, 10 and 11 illustrate alternative methods of handling client-initiated read and/or write requests during a disk-to-disk copy operation, according to various embodiments of the invention.

FIG. 9 illustrates a method 94, according to one embodiment of the invention, for servicing a client-initiated read request during an operation to copy data from a "sick" disk to a target disk. For example, after a disk has been identified by the RAID-based storage system 40 as being likely to fail, the RAID-based storage system 40 may initiate a disk-to-disk copy operation to copy the data contents of the "sick" disk to a replacement disk. During the disk-to-disk copy operation, the RAID-based storage system 40 may continue to service client-initiated read requests. Accordingly, at operation 96, the RAID-based storage system 40 may forward a client-initiated read request to the "sick" disk in an attempt to read the requested data from the "sick" disk. If the read operation is successful, the data will be returned to the RAID-based storage device 40. However, if an error occurs during the read operation, the "sick" disk may communicate an error to the RAID-based storage system 40. In response to receiving the read error, the RAID-based storage system 40 may initiate a reconstruction operation 98 to reconstruct the data that could not be read directly from the "sick" disk.

Figure 10:
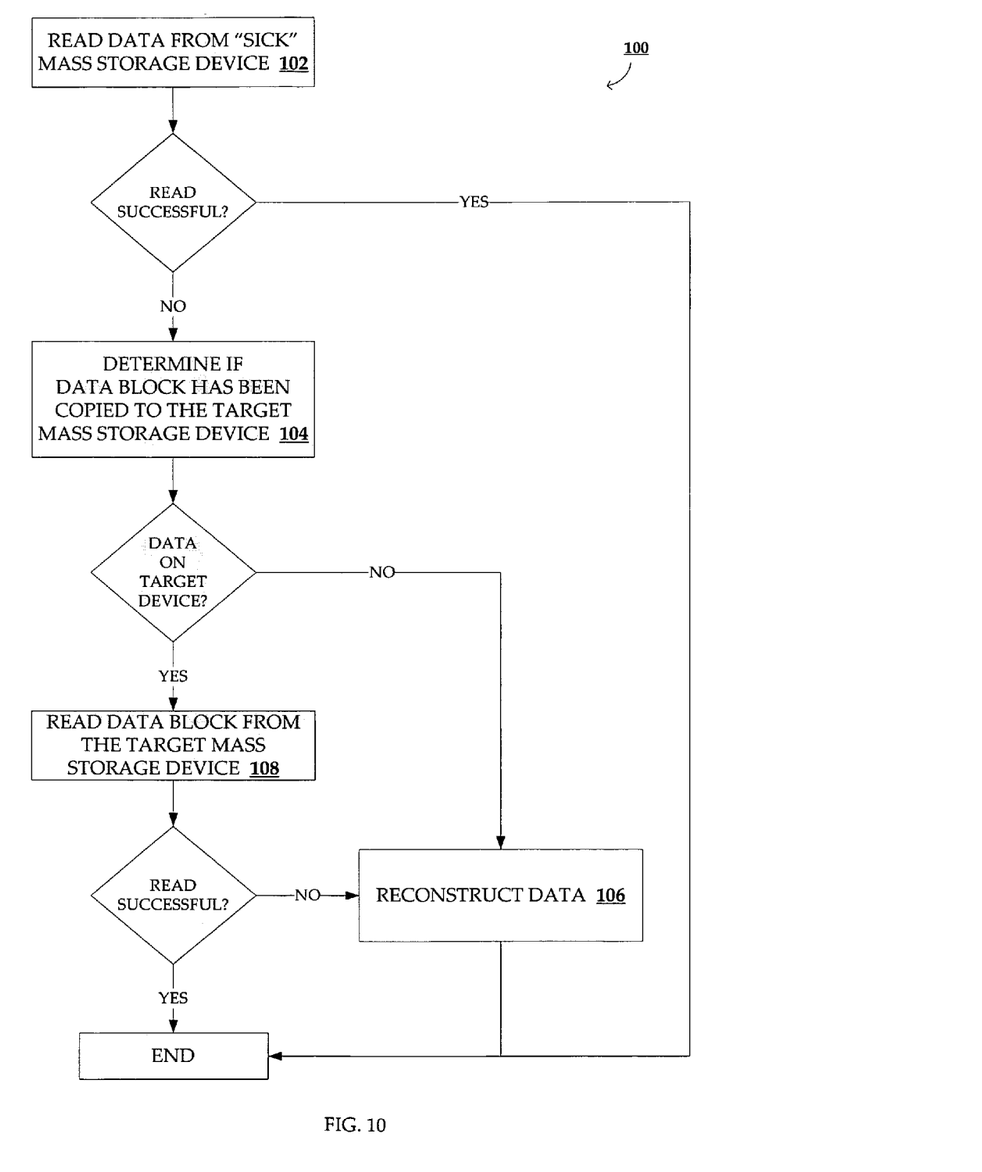

FIG. 10 illustrates an alternative method 100, according to one embodiment of the invention, for servicing a client-initiated read request during a disk-to-disk copy operation. In an alternative embodiment of the invention, at operation 102, the RAID-based storage system 40 may first attempt to read the requested data from the "sick" disk. If the read operation is successful, the requested data is returned to the storage system 40. However, if the read operation fails, then at operation 104 the RAID-based storage system 40 may determine whether the requested disk block has already been copied to the target disk. If, the requested disk block has not been copied to the target disk, then at operation 106, the RAID-based storage system 40 may initiate a reconstruction operation to reconstruct the data that could not be read directly from the disk. However, if the disk block has already been copied to the target disk by the disk-to-disk copy operation, then at operation 108 the storage system 40 may forward the read request to the target disk in an attempt to read the requested data from the target disk. Finally, if the read operation on the target disk fails, the storage system may initiate a data reconstruction operation 106 to reconstruct the data that could not be read directly from either the "sick" disk, or the target disk.

Figure 11:
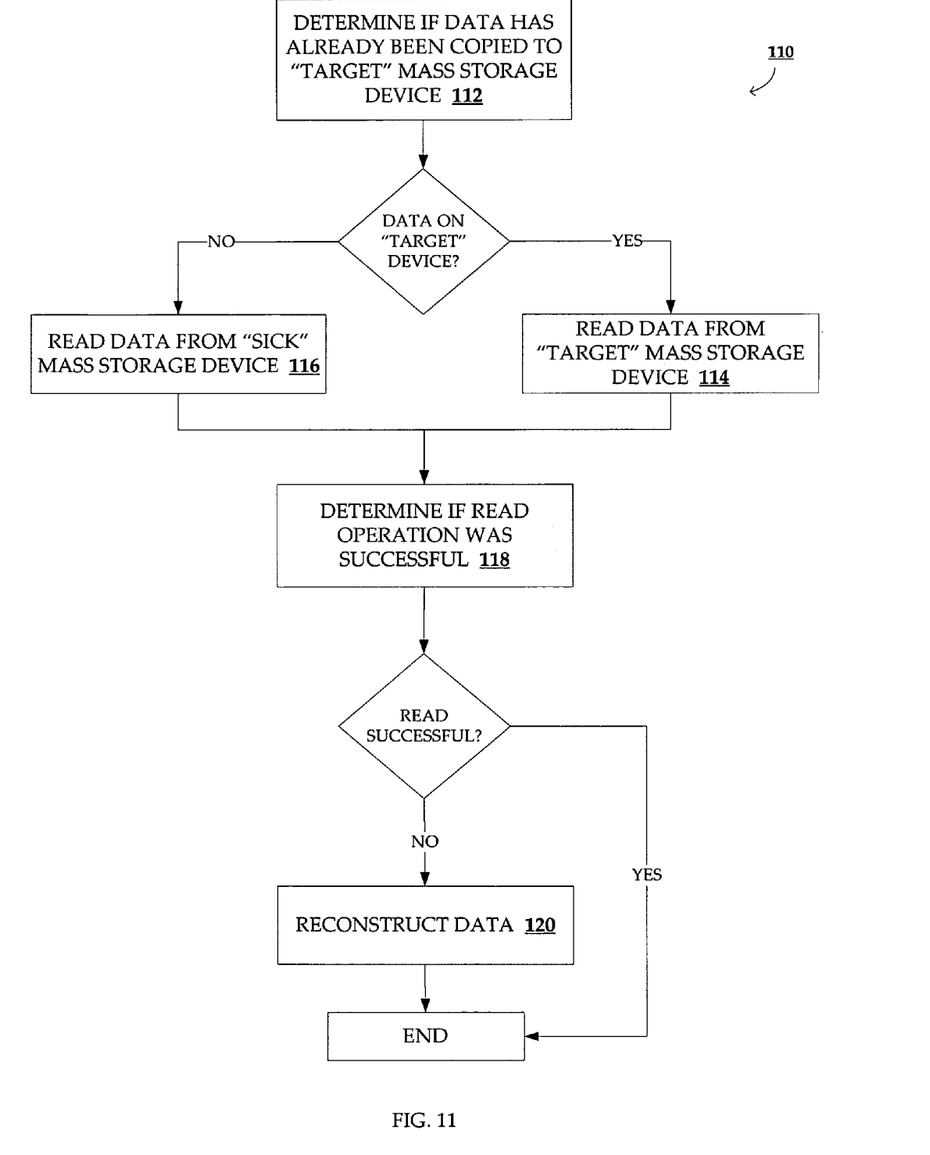

FIG. 11 illustrates yet another method 110, according to an alternative embodiment of the invention, for servicing a read request during a disk-to-disk copy operation. In one embodiment of the invention, each time the RAID-based storage system receives a client-initiated read request during a disk-to-disk copy operation, the RAID-based storage system 40 may determine whether to forward the read request to the "sick" disk, or the target disk, based on the progress of the disk-to-disk copy operation. For example, after receiving a client-initiated read request, the storage system 40 may, at operation 112, determine whether the requested disk block has already been copied to the target disk. Accordingly, if it is determined that the requested disk block has already been copied to the target disk, then the data is read from the target disk at operation 114. However, if the disk block has not yet been copied from the "sick" disk to the target disk, then the disk block is read from the "sick" disk at operation 116. In either case, after attempting to initially read the data, the storage system 40 may, at operation 118, determine whether the read operation completed successfully. If not, the storage system 40 may initiate a data reconstruction operation 120 to reconstruct the data that could not be read directly from either disk.

Thus, a method is provided with reference to specific exemplary embodiments. It will be evident that various modifications and changes may be made to theses embodiments without departing from the broader spirit and scope of the invention. Accordingly, the specification and drawings are to be regarded in an illustrative rather than a restrictive sense.

We claim:

1. A machine-implemented method, comprising:
    predicting an imminent failure of a particular mass storage device in a redundancy group of mass storage devices;
    responsive to predicting the imminent failure of the particular mass storage device, automatically initiating a device-to-device copy operation to copy data from the particular mass storage device to a spare mass storage device;
    during the device-to-device copy operation, receiving a client-initiated read request directed to a storage area on the particular mass storage device, and forwarding the client-initiated read request to the particular mass storage device for servicing;
    upon receiving, from the particular mass storage device, an error indicating the particular mass storage device failed to service the client-initiated read request, determining whether data from the storage area of the particular mass storage device has been copied to the spare mass storage device;
    if data from the storage area of the particular mass storage device has been copied to the spare mass storage device, forwarding the client-initiated read request to the spare mass storage device for servicing; and
    upon completion of the device-to-device copy operation, reconfiguring the redundancy group to replace the particular mass storage device in the redundancy group with the spare mass storage device.

2. The machine-implemented method of claim 1, further comprising:
reconstructing data from a storage area of the particular mass storage device if the particular mass storage device fails to read data from the storage area of the particular mass storage device during a read operation associated with the device-to-device copy operation; and
writing the reconstructed data to the spare mass storage device.

3. The machine-implemented method of claim 2, wherein reconstructing data from a storage area of the particular mass storage device includes:
reading data and/or parity data from mass storage devices in the redundancy group other than the particular mass storage device; and
computing the data from the storage area of the particular mass storage device using the data and/or parity data read from the mass storage devices in the redundancy group other than the particular mass storage device.

4. The machine-implemented method of claim 1, further comprising:
during the device-to-device copy operation, in response to detecting a catastrophic failure of the particular disk, terminating the device-to-device copy operation; and
initiating a data reconstruction operation to reconstruct only data from the particular mass storage device that was not copied to the target mass storage device during the disk-to-disk copy operation.

5. The machine-implemented method of claim 1, further comprising:
during the device-to-device copy operation, preventing client-initiated write requests from being directed to the particular mass storage device by redirecting client-initiated write requests to a mass storage device in the redundancy group other than the particular mass storage device.

6. The machine-implemented method of claim 1, further comprising:
during the device-to-device copy operation, receiving a client-initiated write request directed to a storage area on the particular mass storage device, and mirroring the write request so as to forward the write request to both the particular mass storage device and the spare mass storage device for servicing.

7. The machine-implemented method of claim 1, further comprising:
if data from the particular storage area of the particular mass storage device has not been copied to the spare mass storage device, reconstructing data from the particular storage area of the particular mass storage device.

8. The machine-implemented method of claim 7, wherein reconstructing data from the storage area of the particular mass storage device includes:
reading data and/or parity data from mass storage devices in the redundancy group other than the particular mass storage device; and
computing the data from the storage area of the particular mass storage device using the data and/or parity data read from the mass storage devices in the redundancy group other than the particular mass storage device.

9. The machine-implemented method of claim 1, wherein predicting an imminent failure of a particular mass storage device in a redundancy group of mass storage devices includes:
receiving an error message from the particular mass storage device, the error message indicating the imminent failure of the particular mass storage device.

10. The machine-implemented method of claim 1, wherein predicting an imminent failure of a particular mass storage device in a redundancy group of mass storage devices includes:
receiving one or more error messages from the particular mass storage device; and
automatically analyzing the one or more error messages to determine a pattern of error messages received, the pattern indicating the imminent failure of the particular mass storage device.

11. The machine-implemented method of claim 1, wherein predicting an imminent failure of a particular mass storage device in a redundancy group of mass storage devices includes:
receiving an error message from the particular mass storage device; and
automatically analyzing the error message to determine a frequency with which error messages are received exceeds an error frequency threshold for the particular mass storage device.

12. An apparatus comprising:
read/write hardware logic to read from and write to a plurality of mass storage devices, the plurality of mass storage devices logically configured to include a redundancy group of mass storage devices and one or more spare mass storage devices;
failure prediction logic to predict imminent failure of a particular mass storage device in the redundancy group of mass storage devices;
controller logic to
(i) allocate a target mass storage device selected from the one or more spare mass storage devices, the target mass storage device to replace the particular mass storage device upon completion of a device-to-device copy operation,
(ii) initiate a device-to-device copy operation to copy data from the particular mass storage device to the target mass storage device, and
(iii) logically reconfigure the plurality of mass storage devices so as to replace the particular mass storage device with the target mass storage device in the redundancy group of mass storage devices upon completion of the device-to-device copy operation, wherein the device-to-device copy operation occurs concurrently with one or more client-initiated mass storage device access requests directed to a storage area of the particular mass storage device and wherein, if the client-initiated mass storage device access request is a read request, the read/write hardware logic is to forward the read request to the particular mass storage device for servicing and wherein the read/write hardware logic is to forward the read request to the target mass storage device for servicing, if the particular mass storage device fails to service the read request and the controller logic determines data from the storage area of the particular mass storage device has been copied to the target mass storage device.

13. The apparatus of claim 12, further comprising:
reconstruction logic to reconstruct data from a storage area of the particular mass storage device if data from the storage area cannot be read during a read operation associated with the device-to-device copy operation.

14. The apparatus of claim 13, wherein the reconstruction logic is to initiate a data reconstruction operation to reconstruct data from the storage area of the particular mass storage device if the particular mass storage device fails to service the read request.

15. The apparatus of claim 12, wherein, if the client-initiated mass storage device access request is a write request, the read/write hardware logic is to mirror the write request so as to forward the write request to both the particular mass storage device and the target mass storage device for servicing.

16. The apparatus of claim 12, wherein the failure prediction logic is to receive and analyze one or more error messages from the particular mass storage device.

17. A computer-implemented method, comprising:
predicting imminent failure of a particular disk in a RAID disk group, said particular disk capable of servicing read and/or write requests within predefined time parameters;
allocating a target disk selected from one or more spare disks, said target disk to replace the particular disk in the RAID disk group upon completion of a disk-to-disk copy operation;
initiating the disk-to-disk copy operation to copy data directly from the particular disk to the target disk, said disk-to-disk copy operation occurring concurrently with at least one disk access operation initiated by a client application, the disk access operation requesting access to a disk block on the particular disk;
if the at least one disk access operation initiated by the client application is a read request, forwarding the client-initiated read request to the particular disk for servicing;
upon receiving, from the particular disk, an error indicating the particular disk failed to service the client-initiated read request, determining whether the disk block on the particular disk has been copied to the target disk;
if the disk block on the particular disk has been copied to the target disk, forwarding the client-initiated read request to the target disk for servicing and
upon completion of the disk-to-disk copy operation, reconfiguring the RAID disk group so as to exclude the particular disk from the RAID disk group, and to include the target disk, in place of the particular disk, in the RAID disk group.

18. The computer-implemented method of claim 17, further comprising:
if said disk block on the particular disk has not been copied to the target disk and if said disk block on the particular disk cannot be read by the particular disk, initiating a reconstruction operation to reconstruct the data on the disk block by utilizing data and/or parity data read from disks in the RAID disk group other than the particular disk.

19. The computer-implemented method of claim 17, further comprising:
if said disk access operation initiated by a client application is a write request directed to a disk block on the particular disk, mirroring the write request by forwarding the write request to both the particular disk and the target disk for servicing.

20. The computer-implemented method of claim 17, further comprising:

if a disk block on the particular disk cannot be read in response to a read request associated with the disk-to-disk copy operation, initiating a reconstruction operation to reconstruct the data on the disk block by utilizing data and/or parity data read from disks in the RAID disk group other than the particular disk; and
writing the reconstructed data to the target disk.

21. The computer-implemented method of claim 17, wherein predicting imminent failure of a particular disk in a RAID disk group further comprises:
receiving error messages from the particular disk in the RAID disk group; and
automatically analyzing the error messages to determine whether the frequency with which the error messages are received exceeds a disk-error frequency threshold.

22. The computer-implemented method of claim 17, wherein predicting imminent failure of a particular disk in a RAID disk group further comprises:
analyzing a response time associated with a client-initiated read or write request directed to the particular disk; and
determining whether the response time exceeds a predetermined expected response time.

23. A machine-readable storage medium storing instructions for facilitating the rapid recovery of data from a particular disk in a RAID disk group, the instructions, when executed by a machine, cause the machine to perform the method of:
predicting imminent failure of a particular disk in a RAID disk group, said particular disk capable of servicing read and/or write requests within predefined time parameters;
allocating a target disk selected from one or more spare disks, said target disk to replace the particular disk in the RAID disk group upon completion of a disk-to-disk copy operation;
initiating the disk-to-disk copy operation to copy data directly from the particular disk to the target disk thereby preventing the need to reconstruct data on the particular disk should the particular disk actually fail, said disk-to-disk copy operation occurring concurrently with at least one disk access operation initiated by a client application, the disk access operation requesting access to a data block on the particular disk;
if the at least one disk access operation initiated by the client application is a read request, forwarding the client-initiated read request to the particular disk for servicing;
upon receiving, from the particular disk, an error indicating the particular disk failed to service the client-initiated read request, determining whether the data block on the particular disk has been copied to the target disk;
if the data block on the particular disk has been copied to the target disk, forwarding the client-initiated read request to the target disk for servicing; and
upon completion of the disk-to-disk copy operation, reconfiguring the RAID disk group so as to exclude the particular disk from the RAID disk group, and to include the target disk, in place of the particular disk, in the RAID disk group.

* * * * *